Figure 3:
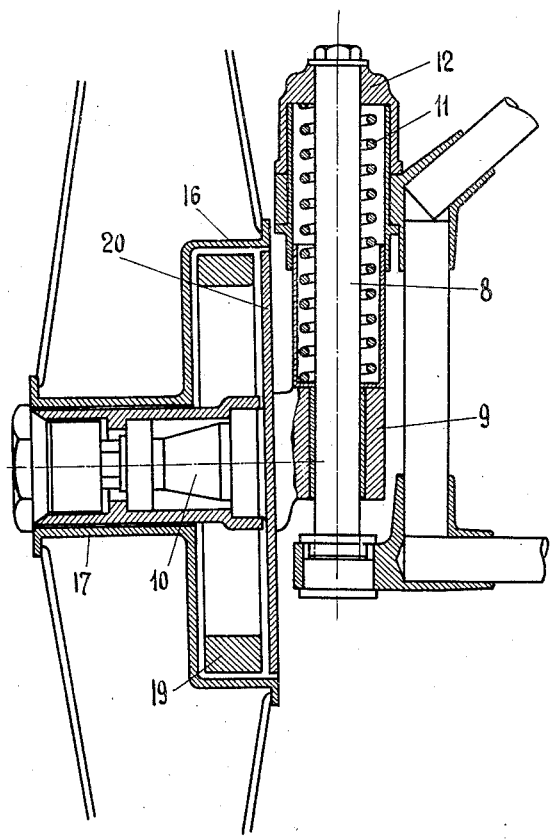

June 16, 1925.  
V. LANCIA  
MOTOR CAR  
Filed Dec. 5, 1922  
1,542,510  
2 Sheets-Sheet 1
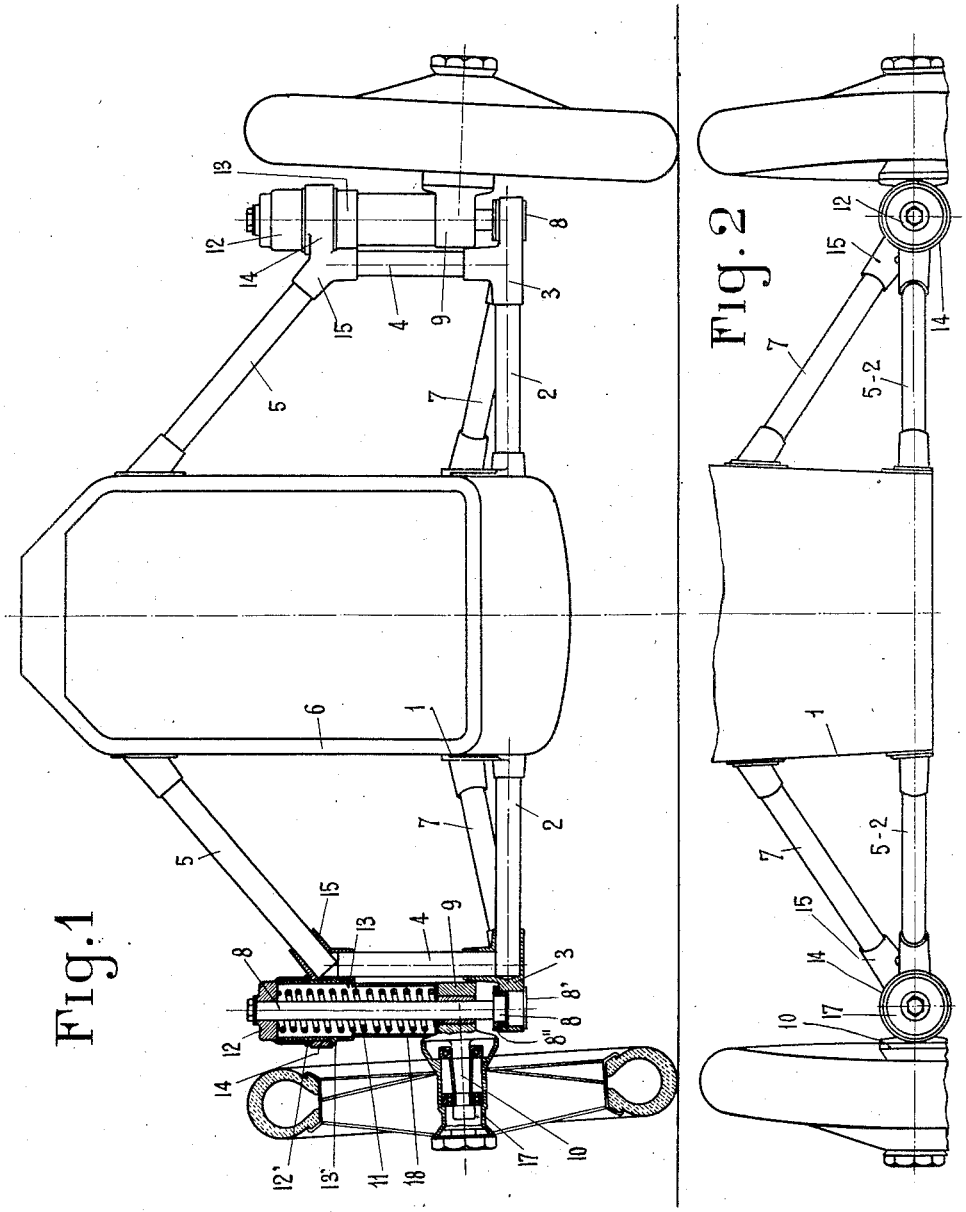
Inventor  
V. Lancia  
by Langner, Parry, Card & Langner  
Attys.

June 16, 1925.  1,542,510
V. LANCIA
MOTOR CAR
Filed Dec. 5, 1922  2 Sheets-Sheet 2

Inventor
V. Lancia
By Langner, Parry, Card & Langner
Atty.

Patented June 16, 1925.

1,542,510

UNITED STATES PATENT OFFICE.

VINCENZO LANCIA, OF TURIN, ITALY.

MOTOR CAR.

Application filed December 5, 1922. Serial No. 605,103.

*To all whom it may concern:*

Be it known that I, VINCENZO LANCIA, subject of the King of Italy, residing at Turin, Italy, have invented new and useful Improvements in Motor Cars; and I do hereby declare the following to be a full, clear, and exact description of the same.

The present invention relates to motor cars and has for its object a structure for mounting on the vehicle frame or body the front wheels of the car without use of a front axle.

The arrangement according to the present invention shows amongst others the advantage that the vehicle body may be arranged very low and near the ground and therefore the car is made more steady.

On the annexed drawing is shown by ways of example an embodiment of the present invention; Figure 1 is a front view of a car showing the structure for supporting the car on the front wheels; Figure 2 is a plan view of the car; Figure 3 is a fragmentary sectional front view of a modified construction.

As shown on the drawing at the front portion 1 of the car is fastened a structure comprising a transverse bar 2 which extends throughout the front of the car and carries at each end a connecting piece 3 in which is secured an upright 4; the upper end of each upright is fastened to a connecting piece 15 solid with a bar 5 which has its opposite end fastened at the top of a frame 6 carrying the radiator, while other inclined bars 7 (see Figure 2) connected to said connecting piece 3 and to the frame act to increase the stiffness of the structure.

At each side of the front portion of the car is thus provided a structure adapted to carry one of the front wheels which is suitably mounted thereon, the mounting being preferably made by resilient means.

In the construction illustrated, to each connecting piece 3 is fastened, by means of a shoulder 8' and a screw-threaded ring 8", a bar 8 having secured on its top end a sleeve 12 in which is screwed a sleeve 13; these sleeves 12 and 13 are provided with abutments 12' and 13' respectively clamping therebetween a ring 14 integral with the connecting piece 15 which interconnects the upright 4 with the top bar 5.

On said bar 8 is mounted to slide a sleeve 9 solid with the pivot 10 for the hub of the wheel which is shown conventionally by 17. A spring 11 is located between the sleeve 9 and the top of the sleeve 12 this spring providing for the resilient suspension of the car on the wheel. A sleeve 18 secured to said sleeve 9 may loosely reciprocate within the outer sleeve 13, it being intended to encircle and protect the spring 11.

The arrangement according to this invention is particularly useful in connection with the mounting of front wheels provided with brakes.

It is known that when the front wheels of a motor car are connected with semi-elliptical springs a braking action exerted on said wheels produces a torsional stress around the wheel axis, which stress is completely supported by the spring.

On the contrary in the construction according to the present invention any braking action which may produce on the pivot 10 a torsional stress around the wheel axis is supported by the sleeve 9 and the bar 8 on which is mounted the same sleeve, and thus no stress acts on the suspension spring.

A construction of this kind is shown by Figure 3 in which the hub 17 of the wheel is provided with a brake drum 16 cooperating with brake shoes 19 suitably pivoted on a plate 20 solid with the pivot 10 for the wheel and the sleeve 9, and acted on by usual means (not shown) as a cam pivoted on said plate 20 and operated by a lever. When the brakes are applied the sleeve 9 and the parts solid therewith are acted on to rotate around the axis of the pivot 10 but such rotation is prevented by the engagement of the sleeve 9 on the rod 8 and therefore no torsional stress is exerted on the spring 11. Of course a suitable length must be imparted to the bore of the sleeve 9 in which is engaged the bar 8 and anti-friction means may also be provided.

In the present specification and appended claims the term "car frame" means not only a conventional frame comprising longitudinal and transverse bars, but any car structure providing a frame or a body or generally the car skeleton, as a shell of sheet metal or the like.

An elliptical or semi-elliptical spring may be connected to the connecting piece 3 instead of the described arrangement but of course in such a case some of the advantages above referred to are lost.

Attention is called to my pending applications Serial Number 605,192 and Serial Number 638,058 in respect of the matter illustrated but not claimed in the present application.

What I claim as my invention and desire to secure by United States Letters Patent is:—

1. In a motor car, a structure for mounting the front wheels of the car, said structure comprising, a cross member having its central portion secured to the vehicle frame, uprights secured to the cross member near its ends, connecting ties between the uprights and the vehicle frame, and means at the ends of said structure for resiliently mounting the front wheels.

2. In a motor car, a structure for mounting the front wheels of the car, said structure comprising, a cross member having its central portion secured to the vehicle frame, uprights secured to the cross member near its ends, connecting ties between the uprights and points of the vehicle frame which are spaced from the points of connection of the cross member with the frame, and means at the ends of said structure for resiliently mounting the front wheels.

3. In a motor car comprising a vehicle frame and a frame for the radiator, a structure for mounting the front wheels, said structure comprising a cross member, the central portion of which is secured to the vehicle frame, uprights secured to said member near its ends, connecting ties between the lower ends of said uprights and rear points of the vehicle frame and between the upper ends of said uprights and points of the radiator frame, and means at the ends of said structure for resiliently mounting the wheels.

4. In a motor car, a structure for mounting the front wheels, said structure comprising a cross member the central portion of which is secured to the vehicle frame, uprights secured to said member near its ends, connecting ties between said uprights and the vehicle frame, guides at the side ends of said structure, said guides having a vertical axis, and means resiliently mounted in said guides and carrying the vehicle wheels.

5. In a motor car comprising a vehicle frame and a frame for the radiator, a structure for mounting the front wheels, said structure comprising a cross member, the central portion of which is secured to the vehicle frame, uprights secured to said member near its ends, connecting ties between the lower ends of said uprights and rear points of the vehicle frame and between the upper ends of said uprights and points of said radiator frame, guides at the side ends of said structure, said guides having a vertical axis, and means resiliently mounted in said guides and carrying the vehicle wheels.

6. In a motor car comprising a vehicle frame and a frame for the radiator, a structure for mounting the front wheels, said structure comprising a cross member the central portion of which is secured to the vehicle frame, uprights secured to said member near its ends, connecting ties between said uprights and the said vehicle and radiator frames, guiding means at the side ends of said structure, said guiding means having a vertical axis, and means resiliently mounted in said guides and carrying the vehicle wheels.

7. In a motor car comprising a vehicle frame and a frame for the radiator, a structure for mounting the front wheels, said structure comprising a cross member the central portion of which is secured to the vehicle frame, uprights secured to said member near its ends, connecting ties between said uprights and the vehicle and radiator frames, guiding means with vertical axis at each end of said structure, a part carrying a wheel mounted to reciprocate in each of said guiding means, and resilient means cooperating with said guiding means and wheel carrying parts.

8. In a motor car comprising a vehicle frame and a frame for the radiator, a structure for mounting the front wheels, said structure comprising a cross member the central portion of which is secured to the vehicle frame, uprights secured to said member near its ends, connecting ties between said uprights and the vehicle and radiator frames, guiding means with vertical axis at each end of said structure, a part carrying a wheel mounted to reciprocate in each of said guiding means and engaging said guiding means at points spaced from each other, and resilient means cooperating with said guiding means and wheel carrying parts.

9. In a motor car comprising a vehicle frame and a frame for the radiator, a structure for mounting the front wheels, said structure comprising a cross member the central portion of which is secured to the vehicle frame, uprights secured to said member near its ends, connecting ties between said uprights and the vehicle and radiator frames, guiding means with vertical axis at each end of said structure, a part carrying a wheel mounted to reciprocate in each of said guiding means, a brake gear carried by said part, a brake drum on said wheel for cooperation with said brake gear, and resilient means cooperating with said guiding means and wheel carrying parts.

10. A motor car having at each side of its front end a structure comprising a vertical bar, transverse bars connecting the ends of the bar with the car frame, inclined bars connected with the first named bars and with points of the car frame distant from the points of connection of said first named bars, a part mounted to reciprocate on said vertical bar, resilient means for damping the respective motion of said reciprocating part and vertical bar, a pivot carried by said reciprocating part and a wheel mounted on said pivot.

11. A motor car having at each side of its front end a vertical bar, bars connecting one end of said bar with the car frame, a bell sleeve secured on the opposed end of said vertical bar, a bar connecting this sleeve with the car frame, a part mounted to reciprocate on said vertical bar, a spring mounted on said vertical bar and being arranged between the said sleeve and reciprocating part, a pivot carried by said reciprocating part and a wheel mounted on said pivot.

12. A motor car having at each side of its front end a vertical bar, bars connecting one end of said bar with the car frame, a bell sleeve secured on the opposed end of said vertical bar, a bar connecting this sleeve with the car frame, a part mounted to reciprocate on said vertical bar, a spring mounted to encircle said vertical bar and arranged between the said sleeve and reciprocating part, a sleeve on said reciprocating part cooperating with the said bell sleeve to enclose said spring, a pivot on said reciprocating part and a wheel mounted on said pivot.

13. A motor car having at each side of its front end a structure comprising a vertical bar, bars connecting the ends of this verical bar with the car frame, a part mounted to reciprocate on said vertical bar, resilient means for damping the respective motion of said reciprocating part and vertical bar, a pivot carried by said reciprocating part, a brake gear carried by this reciprocating part, a wheel mounted on said pivot and a brake drum on said wheel for cooperation with said brake gear.

14. A motor car having at each side of its front end a structure comprising a vertical bar, bars connecting the ends of this vertical bar with the car frame, a part mounted to reciprocate on said vertical bar and having a substantial surface of contact with it, resilient means for damping the respective motion of said reciprocating part and vertical bar, a pivot carried by said reciprocating part, a brake gear carried by this reciprocating part, a wheel mounted on said pivot, and a brake drum on said wheel for cooperation with said brake gear.

In testimony whereof, I have signed my name to this specification.

VINCENZO LANCIA.